United States Patent [19]

Lampe

[11] Patent Number: 4,612,912
[45] Date of Patent: Sep. 23, 1986

[54] DOUBLE-LAYERED THERMAL ENERGY STORAGE MODULE

[75] Inventor: W. Dean Lampe, Omaha, Nebr.

[73] Assignee: InterNorth, Inc., Omaha, Nebr.

[21] Appl. No.: 775,388

[22] Filed: Sep. 12, 1985

[51] Int. Cl.$^4$ ................................................ F24J 2/00
[52] U.S. Cl. ..................................... 126/400; 165/10; 126/445
[58] Field of Search ............... 126/400, 445, 431, 433, 126/444; 165/166, 167, 10 A, 104.11, 104.12

[56] References Cited

U.S. PATENT DOCUMENTS

| | | | |
|---|---|---|---|
| 53,022 | 3/1866 | Martin | 165/167 |
| 884,600 | 4/1908 | Moreau | 165/167 |
| 3,887,664 | 6/1975 | Regehr | 165/166 |
| 4,303,123 | 12/1981 | Skoog | 165/166 |
| 4,376,460 | 3/1983 | Skoog | 165/167 |
| 4,393,861 | 7/1983 | Beard et al. | 126/431 |
| 4,398,593 | 8/1983 | Casinelli | 126/400 |
| 4,470,453 | 9/1984 | Laughlin et al. | 165/167 |
| 4,498,459 | 2/1985 | Korin et al. | 126/431 |
| 4,516,632 | 5/1985 | Swift et al. | 165/167 |
| 4,534,337 | 8/1985 | Janson | 126/445 |

Primary Examiner—Samuel Scott
Assistant Examiner—H. A. Odar
Attorney, Agent, or Firm—Zarley, McKee, Thomte, Voorhees & Sease

[57] ABSTRACT

A double-layered thermal energy storage module comprising front and rear vertically disposed storage sections separated by a flat sheet positioned therebetween. The upper end, lower end, and sides of the storage sections are sealed except for inlet and outlet connections. Each of the storage sections are provided with a plurality of spaced-apart phase change material storage tube segments having fluid flow channel segments positioned therebetween. The segments in the front section are disposed at an opposite angle to the segments in the rear section. The ends of the tube segments in the front section communicate with ends of tube sections in the rear section. The ends of the channel segments in the front section communicate with ends of channel segments in the rear section. The tube segments are filled with a phase change material while the channel segments are filled with a heat transfer fluid.

1 Claim, 5 Drawing Figures

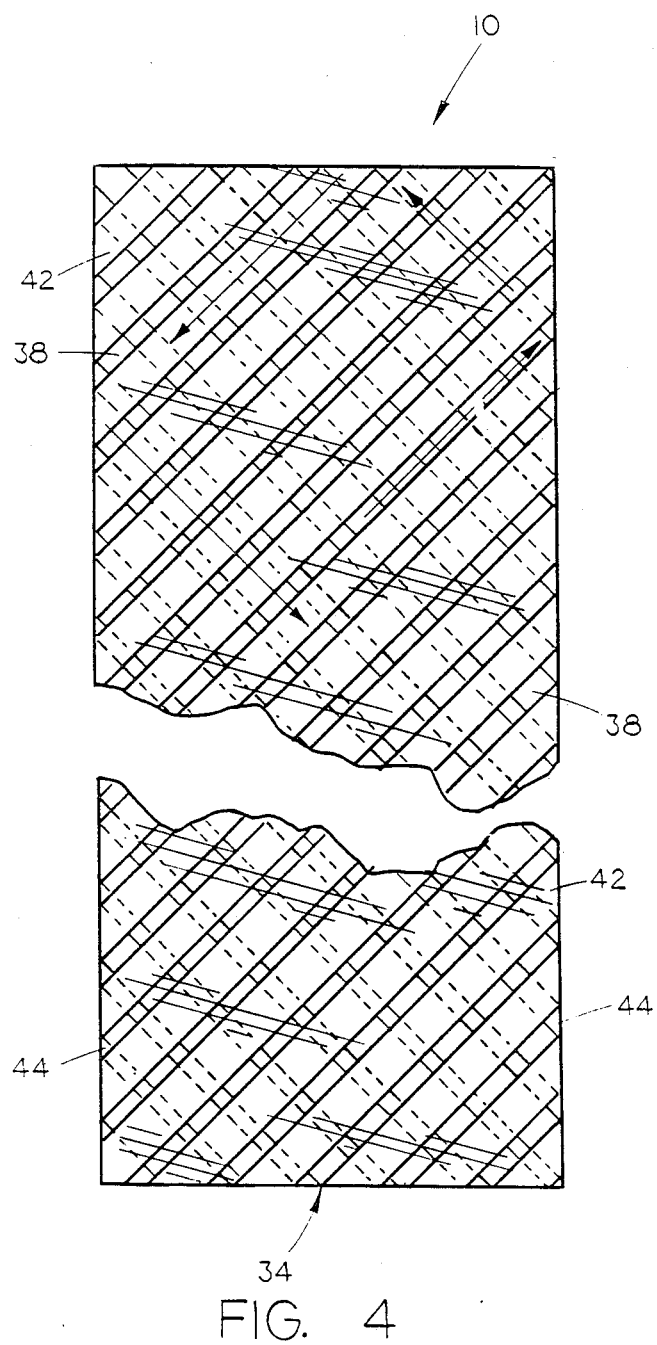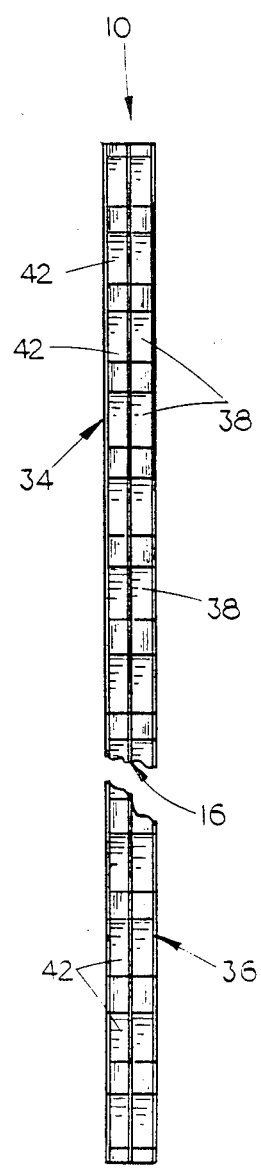
FIG. 4
FIG. 5

4,612,912

DOUBLE-LAYERED THERMAL ENERGY STORAGE MODULE

BACKGROUND OF THE INVENTION

This invention relates to a thermal energy storage module and more particularly to an improved thermal energy storage module.

Thermal energy storage devices of the prior art normally consist of a double tubular thermal energy storage element having a serpentine configuration. Other prior art devices consists of stacks of water-filled cans or polymeric containers containing phase change material. The devices of the prior art are less than efficient and it is a principal object of this invention to provide a much more efficient thermal energy storage module.

A principal object of the invention is to provide an improved thermal energy storage module.

A further object of the invention is to provide a thermal energy storage module which may be designed so that it will fit between the studs of exterior or interior walls of houses or other buildings.

A further object of the invention is to provide a thermal energy storage module which may be charged directly by means of radiant energy.

A further object of the invention is to provide a thermal energy storage module which may be charged with hot water or air from separate solar panels or other heat sources.

A further object of the invention is to provide a thermal energy storage module which may be charged with cool air or chilled water from various refrigeration devices.

Still another object of the invention is to provide a thermal energy storage module which permits the use of a maximum quantity of thermal energy storage material per unit volume of confined space while retaining optimal control over heat transfer between the storage material and the heat transfer fluid.

These and other objects will be apparent to those skilled in the art.

BRIEF DESCRIPTION OF THE DRAWINGS

FIG. 4 is a front elevational view illustrating the flow patterns of the heat transfer fluid and phase change material; and FIG. 5 is a side view of the module of FIG. 4.

SUMMARY OF THE INVENTION

A double-layered thermal energy storage module is described comprising front and rear vertically disposed storage sections having upper and lower ends, opposite side edges and front and rear walls. A flat tube sheet is positioned between the front and rear storage sections. The front storage section is provided with a plurality of space-apart phase change material storage tube segments provided therein which extend at an angle with respect to the side edges of the section. Positioned between the tube segments are heat transfer fluid flow channel segments. The rear storage segment is also provided with phase change material storage tube segments and heat transfer fluid flow channel segments which are disposed opposite to those of the front storage section. The ends of the storage tube segments in the front section communicate with the ends of a pair of tube segments in the rear storage section. Similarly, the ends of each of the channel segments in the front storage section communicate with a pair of channel segments in the rear storage section. The tube segments in both of the storage sections are filled with a phase change material while a heat transfer fluid is positioned in the channel segments in both of the sections. The design of the energy storage module permits the use of a maximum quantity of thermal energy storage material per unit volume of confined space while retaining optimal control over heat transfer between the storage material and the heat transfer fluid.

DESCRIPTION OF THE PREFERRED ENBODIMENT

Figure 1:
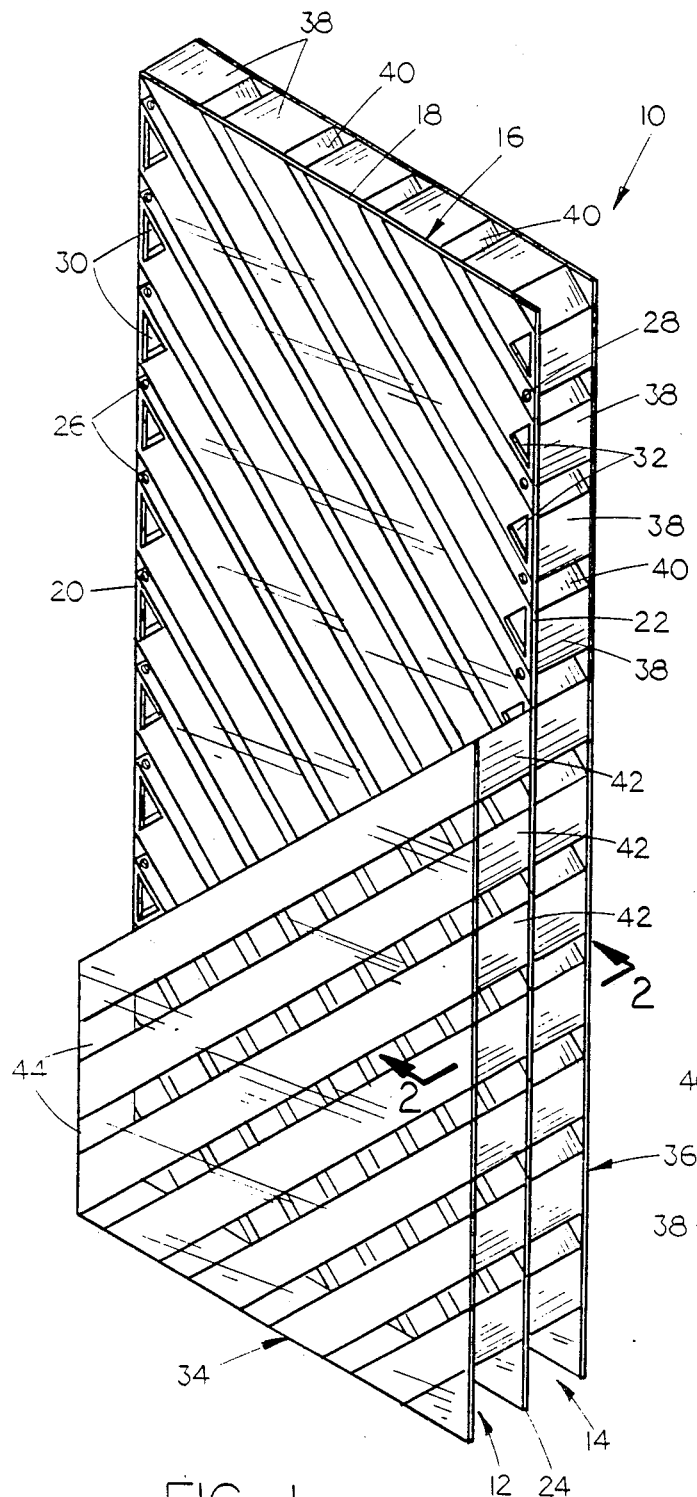
FIG. 1 is a perspective view of the thermal energy storage module of this invention with a portion thereof cut away to more fully illustrate the invention.
Figure 2:
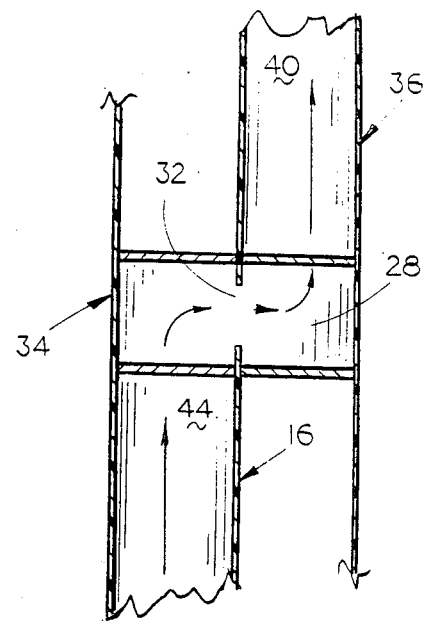
FIG. 2 is an enlarged sectional view seen on lines 2-2 of FIG. 1.
Figure 3:
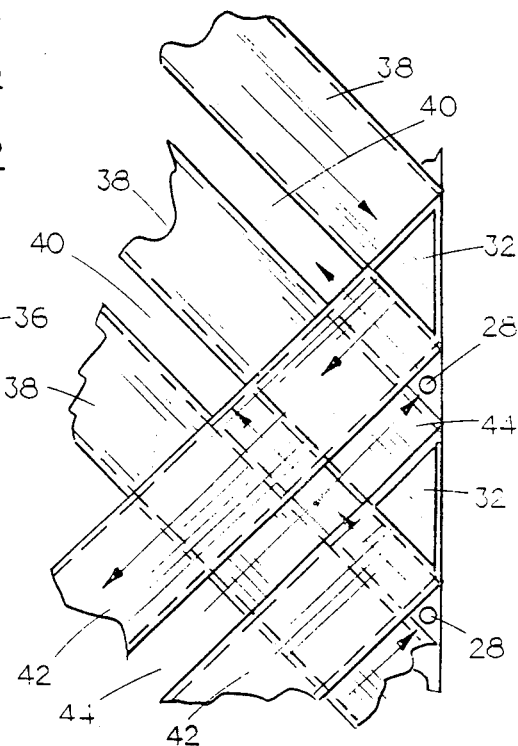
FIG. 3 is a partial elevational view illustrating the flow paths of the phase change material and heat transfer fluid.

The numeral 10 refers to the thermal energy storage module of this invention including front and rear storage sections 12 and 14 respectively. In FIG. 1, a portion of front storage section 12 is cut-away to more fully illustrate the invention. Center sheet 16 separates the front and rear storage sections and includes an upper edge 18, side edges 20 and 22, and bottom edge 24. Sheet 16 is provided with a plurality of spaced-apart circular or other shaped openings 26 along side edge 20 and a plurality of spaced-apart circular or other shaped openings 28 along side edge 22. Sheet 16 is also provided with a plurality of triangular or other shaped openings 30 which are positioned between the circular openings 26 and a plurality of triangular or other shaped openings 32 which are positioned between the circular openings 28. Module 10 is also provided with a front sheet member 34 and a back sheet member 36 which are positioned forwardly and rearwardly of sheet 16 in a spaced-apart relationship. A plurality of box-like phase change material storage tube segments 38 are provided in the rear storage section and extend angularly upwardly from the right side of the section to the left side of the section as illustrated in FIG. 1. Positioned between the tube segments 38 are fluid flow channel segments 40. The front storage section 12 is also provided with a plurarlity of spaced-apart phase change material storage tube segments 42 which are also angularly inclined but which are oppositely disposed to the tube segments 38. Positioned between the tube segments 42 in front section 12 are fluid flow channel segments 44. As seen in the drawings, the ends of the tube segments 42 in front section 12 are positioned so that they are located adjacent the ends of two separate tube segments 38 in the rear section 14. The ends of the tube segments 38 and 42 are provided with suitable openings formed therein which register with the associated tube segments. The triangular-shaped openings 32 in the sheet 16 provide communication between the ends of the tube segments 38 and 42. Likewise, the openings 28 provide communication between the ends of the segments 44 and front section 12 and the segments 40 in the rear section 14. A suitable phase change material is positioned in the segments 42 and 38 and a suitable heat transfer fluid is positioned in the segments 40 and 44. The upper and lower ends as well as the sides of the module 10 are sealed with suitable sheet members so that the module is completely sealed except for heat transfer fluid flow inlet and outlet connections.

In operation, the tube segments 38 in the rear section 14 and tube segments 42 in the front section 12 are filled with a phase change material and the fluid flow channel segments 40 and 44 are filled with a suitable heat transfer fluid. The module is provided with suitable heat transfer fluid inlet and outlet openings so that the heat transfer fluid may pass through the channel segments 40 and 44. The material storage tube segments and the fluid flow channel segments in each of the front and rear sections are parallel to each other but are oppositely disposed in the two sections at an angle greater than 0° but less than 90° from the horizontal plane. The heat transfer fluid direction may be either upward or downward depending upon the mode of operation. The module design of this invention permits the use of a maximum quantity of thermal energy storage material per unit volume of confined space while retaining optimal control over the heat transfer between the storage material and the heat transfer fluid. The modules of this invention may be readily incorporated within both exterior and interior walls of buildings.

Polymeric phase change thermal energy storage materials are less dense (and therefore occupy a larger volume per unit of mass) in the liquid state than in the solid state. Therefore, as the material solidifies, voids or air pockets will form. The voids or air pockets tend to migrate through the remaining liquid phase and collect between the top surface of the phase change material and the container wall, thereby forming an effective barrier to heat transfer along the top of the container. The interconnected inclined storage concept of this invention not only allows selection of the optimum contact time between the storage material and heat transfer fluid for a given fluid flow rate, but also is believed to minimize or eliminate the thermal energy barrier formation problem and thereby improve overall module heat transfer efficiency.

It can therefore be seen that the invention accomplishes at least all of its stated objectives.

I claim:
1. A multiple-layered thermal energy storage module, comprising,
   at least front and rear upstanding storage sections having upper and lower ends, opposite side edges, and front and rear walls,
   a flat sheet positioned between said front and rear storage sections,
   said front storage section having a plurality of spaced-apart, quadrilateral shaped phase change material storage tube segments provided therein extend between said side edges, said tube segments being disposed at an angle with respect to said upper and lower ends of said front storage section,
   said front storage section having a quadrilateral shaped fluid flow channel segment positioned between said tube segments,
   said rear storage section having a plurality of spaced-apart, quadrilateral shaped phase change material storage tube segments provided therein which extend between said side edges, said tube segments of said rear storage section being disposed at an equal but opposite angle to the tube segments of said front storage section,
   said rear storage section having a quadrilateral shaped fluid flow channel segment positioned between said tube segments,
   a phase change material in said storage tube segments in said front and rear storage sections,
   a heat transfer fluid in said channel segments in said front and rear storage sections,
   the ends of each of said tube segments in said front storage section in communication with a pair of tube segments in said rear storage section,
   the ends of each of said channel segments in said front storage section being in communication with a pair of tube segments in said rear storage section whereby the heat transfer fluid will successively move through a channel segment in said front storage section and thence through a channel segment in said rear storage section.

* * * * *